Aug. 9, 1960    J. D. LARSON    2,948,593
DIGESTER FOR CONVERTING INORGANIC MATERIAL
INTO ASSIMILABLE PLANT FOOD
Filed April 15, 1957
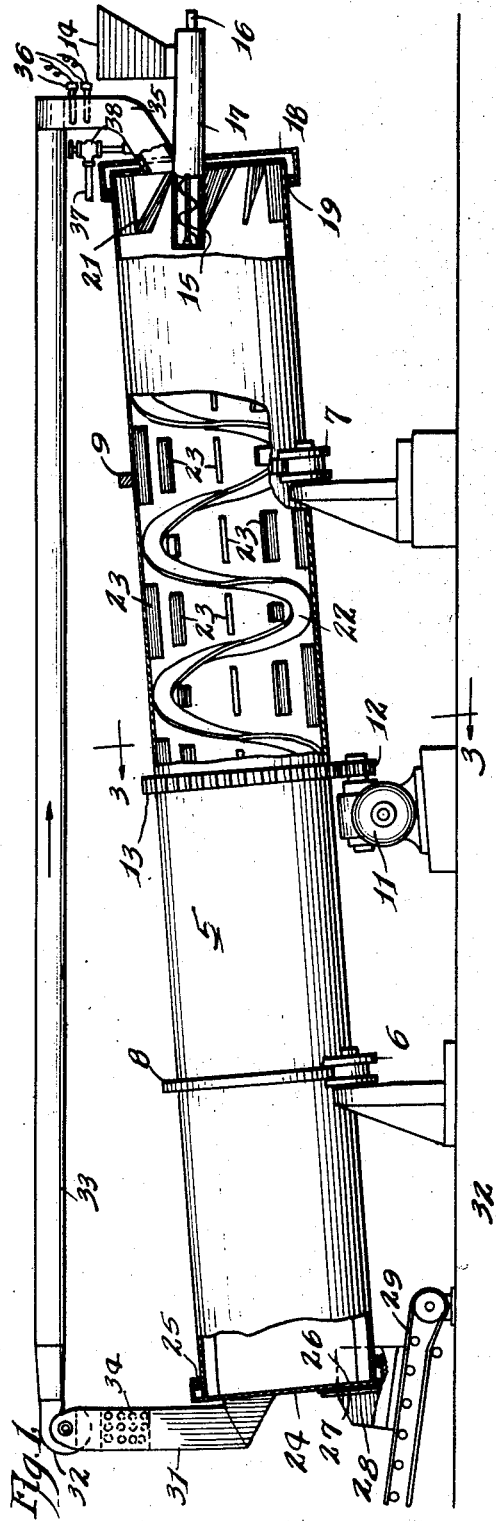
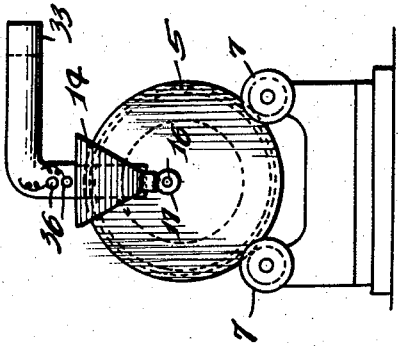
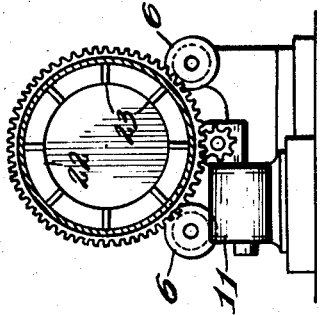
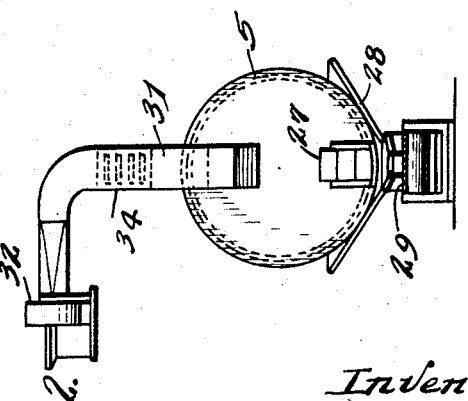
Inventor.
John D. Larson.
By Wilson & Geppert
Attorneys.

United States Patent Office 2,948,593
Patented Aug. 9, 1960

2,948,593

DIGESTER FOR CONVERTING INORGANIC MATERIAL INTO ASSIMILABLE PLANT FOOD

John David Larson, P.O. Box 162, Hinsdale, Ill.

Filed Apr. 15, 1957, Ser. No. 653,023

1 Claim. (Cl. 23—259.1)

This invention pertains to the production of organic fertilizers readily assimilable by growing vegetation, and more particularly to apparatus for the production of such material by treatment of phosphate rock or other inorganic material to convert the same to organic readily assimilable material.

In my pending application Serial No. 612,041, filed September 25, 1956, there is disclosed a method of converting inert inorganic material compounds of phosphate rock or the like into plant assimilable form. My present invention aims to provide an apparatus by means of which said process may be commercially, efficiently and economically practiced.

Speaking generally, my present invention consists of a digester including a rotatable drum of substantial length through which the components of the ultimate product are slowly passed while being agitated and throughly mixed and at the same time subjected to a fermentation action which is expedited and augmented by the maintenance of a circulation through the drum of fluid comprising air and mixed gases resulting from the fermentation. The temperature, humidity and rate of circulation of the fluid are automatically controlled so as to enable the ultimate product to be produced during a single passage through the drum in a minimum amount of consumed time.

In order to facilitate an understanding of my invention, the same is disclosed in its preferred embodiment on the accompanying drawing, referring to which:

Figure 1 is a side elevation partially broken away of a digester embodying my invention;

Fig. 2 is an end elevation looking toward the lefthand end of the apparatus disclosed in Fig. 1;

Fig. 3 is a transverse sectional view on the line 3—3 of Fig. 1; and

Fig. 4 is an end elevation looking toward the righthand end of the apparatus shown in Fig. 1.

Referring to the drawing more in detail, reference character 5 indicates generally the drum of the digester which may be of any preferred dimensions and capacity, but for illustrative purposes it may be about seventy-five feet in length and eight to ten feet in diameter. The drum is rotatably supported, preferably in inclined position as shown in Fig. 1, by supporting rollers 6 and 7 upon which circular tracks 8 and 9 embracing and fixed to the drum rotatably rest. Rotative movement is imparted to the drum by a motor 11 through a drive pinion 12 meshing with a ring gear 13 fixed to the perimeter of the drum. The inclination of the drum from end to end is not essential, but it facilitates the travel of the drum contents from the in-feed to the delivery end.

The components of the ultimate product consists of inorganic material such as granite, limestone, clay and gypsum or the like, and organic material such as peat, sewage sludge, horse manure or the like, the ratio of inorganic materials to organic being preferably in the ratio of two to five. The inorganic materials are first pulverized and mixed with the organic materials in the desired proportions, whereupon the mixture is deposited in the hopper 14 from whence it is fed by a screw conveyor 15, the shaft 16 of which is driven from any suitable source of power, and delivered into the in-feed end of the drum. The conveyor screw is housed in a conduit 17 which extends through the stationary end 18 of the cylinder, a suitable annular gasket 19 being interposed between the drum and the surrounding portion of the end 18 for the purpose of forming a seal between the rotating drum and the stationary end. A series of annularly arranged wings or deflectors 21 prevent the delivered material from accumulating at the intake end.

The drum is slowly rotated at a speed of about four revolutions per hour, and to insure propulsion of the drum contents toward the discharge end, a spiral web or flange 22 is mounted upon the inner face of the drum. As illustrated in Fig. 1, this flange is in the form of a continuous spiral, although it may if preferred consist of a series of spaced apart inwardly projecting flanges disposed at an angle to the longitudinal axis of the drum. To insure subjection of the material traveling through the drum to the action of the fluid circulating therethrough, a series of agitating devices in the form of longitudinally disposed blades or flanges 23 are carried by the drum walls and project inwardly so that as the drum rotates these flanges will carry the material upwardly until it drops by gravity, thereby insuring a thorough mixing of the components as well as aeration by the fluid circulating through the drum.

The end wall 24 at the discharge end of the drum is stationarily supported and a seal ring 25 similar to the seal ring 19 seals the space between the stationary end wall and the rotating drum. A discharge opening 26 through the end wall 24 is arranged to be totally or partially closed by a vertically slidable gate 27. In practice this gate will remain closed when the operation is started until the treated material arrives at the discharge end of the drum, whereupon the gate will be partially opened to permit the continuous delivery of the processed material. The delivered material is received in a hopper 28 from which it is discharged upon an endless conveyor 29 by which it is delivered to a place of storage or to a truck for transportation. During its travel from end to end of the drum, which is regulated to occur in about twenty-four hours, the material being mixed and propelled is at the same time subjected to a fermentation action induced and augmented by the circulation of gaseous fluid through the drum. The fermentation occurring in the drum generates heat and various gases which are withdrawn from the delivery end of the drum through a conduit 31 by a fan 32, the intake of which communicates with the conduit 31 and the discharge from which is connected with a conduit 33. For the purpose of relieving the gases withdrawn from the drum of excess moisture, a dehumidifier 34 is interposed in the conduit 31, the dehumidifier being of any commercial form equipped with an automatic control which enables the dehumidifier to relieve the gases passing therethrough from moisture in excess of that for which the control is set.

The other end of conduit 33 communicates through an angular extension 35 with the intake end of the drum. To insure the maintenance of the requisite temperature in the digester, the conduit extension 35 is equipped with a thermostatically controlled heating element 36.

Since in some climates or under certain atmospheric conditions the humidity in the drum requisite to the most efficient maintenance of fermentation might sometimes drop too low, a water supply pipe 37 communicates with the interior of the conduit 35 and is equipped with a suitable spray head by which moisture may be introduced into the return air and gases entering the drum. A valve 38 in the pipe 37 is automatically controlled by a humidistat disposed in the conduit 33 or in the conduit 35.

From the foregoing it will be apparent that the components of the end product delivered from the hopper or magazine 14 into the intake end of the drum are slowly propelled lengthwise of the drum and simultaneously stirred and agitated so as to become thoroughly mixed and subjected to the influence of the fluid circulating continuously through the drum. This fluid, consisting of air together with gases generated by the fermentation proceeding in the drum, has its temperature and humidity auotmatically controlled so as to maintain the conditions most favorable to the efficient and economical production of the end product.

While a preferred embodiment of my invention has been shown and described for illustrative purposes, it should be apparent that variations in the details disclosed may be resorted to within the scope of my invention as defined in the following claim.

I claim:

A digester for converting inorganic material into assimilable plant food, comprising the combination of an elongated drum, a plurality of sets of supporting rollers upon which said drum is rotatably supported, means for rotating said drum, a spiral material propelling flange projecting inwardly from the walls of said drum, longitudinally extending agitating devices disposed between the spirals of said propelling flange, means for closing the ends of said drum so as to provide a substantially sealed fermentation chamber in which bacteriological activity in the material being treated is promoted, means for feeding material to be processed into the intake end of said drum, means for delivering the processed material from the other end of said drum, means for creating and maintaining a circulation of a gaseous fluid through said drum from end to end thereof in the direction of the travel of the material being processed therein, said circulating means including a conduit communicating with the delivery end and a conduit communicating with the intake end of said drum, a blower communicating with said first mentioned conduit, an intermediate conduit leading from the blower and said first mentioned conduit and thereby connecting the intermediate conduit with the feeding end of said drum, temperature control means in said conduit communicating with the intake end of said drum to automatically control the temperature in said drum, dehumidifying means in the conduit communicating with the delivery end of said drum for automatically removing excess moisture from the gaseous fluid in said last mentioned conduit, and moisture supply means in said conduit communicating with the intake end of said drum for supplying any required moisture to said circulating gaseous fluid to maintain a predetermined humidity in said drum.

References Cited in the file of this patent

UNITED STATES PATENTS

| | | |
|---|---|---|
| 572,258 | Hogan | Dec. 1, 1896 |
| 1,041,565 | Arthur | Oct. 15, 1912 |
| 2,080,508 | Sackett | May 18, 1937 |
| 2,311,824 | Gautreau | Feb. 23, 1943 |
| 2,720,710 | Erisman | Oct. 18, 1955 |